United States Patent [19]

Storck et al.

[11] Patent Number: 5,361,254
[45] Date of Patent: Nov. 1, 1994

[54] SWITCH MECHANISM FOR SWITCHING SIGNALS AT INPUTS ONTO OUTPUTS AND SWITCHING NETWORKS FOR INTERLINKING FIRST AND SECOND TRANSMISSION MEDIA

[75] Inventors: Eckhard Storck; Hans-Hermann Witte, both of Munich, Germany

[73] Assignee: Siemens Aktiengesellschaft, Munich, Germany

[21] Appl. No.: 983,040

[22] Filed: Nov. 30, 1992

[30] Foreign Application Priority Data

Dec. 20, 1991 [DE] Germany .............................. 4142337
May 26, 1992 [EP] European Pat. Off. ........ 92108865.4

[51] Int. Cl.$^5$ .......................... H04J 1/00; H04J 14/02; H04Q 11/02
[52] U.S. Cl. ..................................... 370/57; 370/69.1
[58] Field of Search ...................... 370/57, 69.1, 53, 3; 359/115, 117, 118, 124

[56] References Cited

U.S. PATENT DOCUMENTS

4,349,903 9/1982 Kübler .................................. 370/57

FOREIGN PATENT DOCUMENTS

0429046 5/1991 European Pat. Off. .

OTHER PUBLICATIONS

"A Coherent Photonic Wavelength–Division Switching System for Broad–Band Networks", by Masahiko Fujiwara, et al., IEEE Journal of Lightwave Technology, vol. 8, No. 3, Mar. 1990, pp. 416–422.
"A New Architecture for Packaging Wideband Communication Equipment Using A 3-D, Orthogonal Edge-To-Edge Topology", by Donald K. Wilson, IEEE 1988, pp. 13.51 through 13.6.1.
"A Study of Non–Blocking Switching Networks", by Charles Clos, B.S.T.J., vol. 32, 1953, pp. 406–424.
"Pulstechnik", by E. Hoelzler et al., vol. 2, Springer Verlag, 1984, p. 378.
"A Photonic Wavelength–Division Switching System Using Tunable Laser Diode Filters", S. Suzuki et al., Conference Record, IEEE International Conference on Communications, Jun. 11–14, 1989, pp. 722–727.
"Frequency Tunable Laser Diodes and Their Application to Coherent Systems", I. Mito et al., Proceedings, 14th European Conference on Optical Communication, Sep. 11–15, 1988, pp. 74–77.

*Primary Examiner*—Wellington Chin
*Assistant Examiner*—Min Jung
*Attorney, Agent, or Firm*—Hill, Steadman & Simpson

[57] ABSTRACT

A switch mechanism for switching signals at inputs onto outputs and switching networks for interlinking first and second transmission media. Switching networks for interlinking first and second transmission media for the transmission of signals in frequency-division or space-division multiplex have a substantially simpler architecture in comparison to known switching networks. To that end, the switching networks are constructed with a new switch mechanism composed of a plurality of adjustable frequency converters of the input side, of a means for distributing the signals and of doubly adjustable frequency converters of the output side and/or of a plurality of doubly adjustable frequency converters of the input side, a means for distributing the signals and adjustable frequency converters of the output side. A simpler structure can be achieved in a known switching network of the Clos type in that shared-medium switches of two different types are employed. The switch mechanism can be used in electrical and optical switching systems.

29 Claims, 7 Drawing Sheets

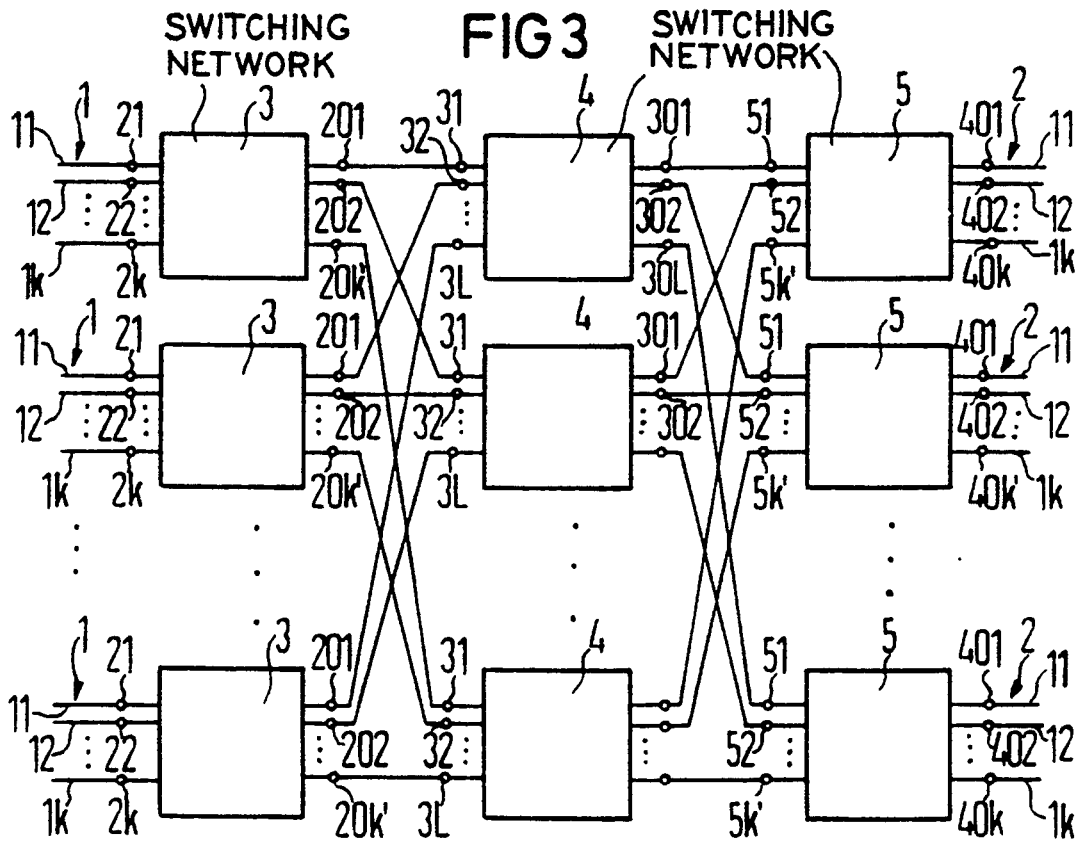
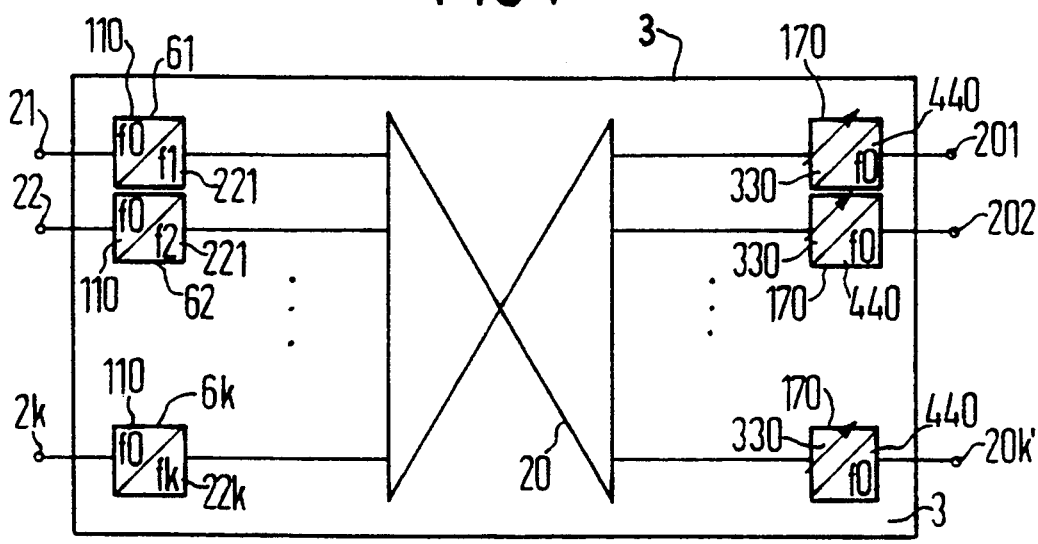

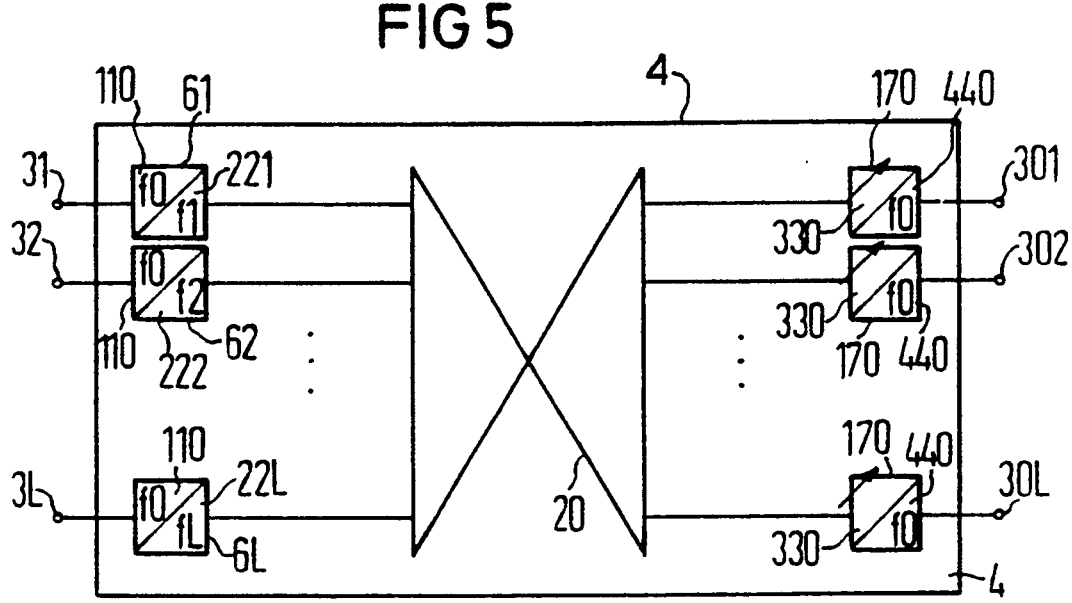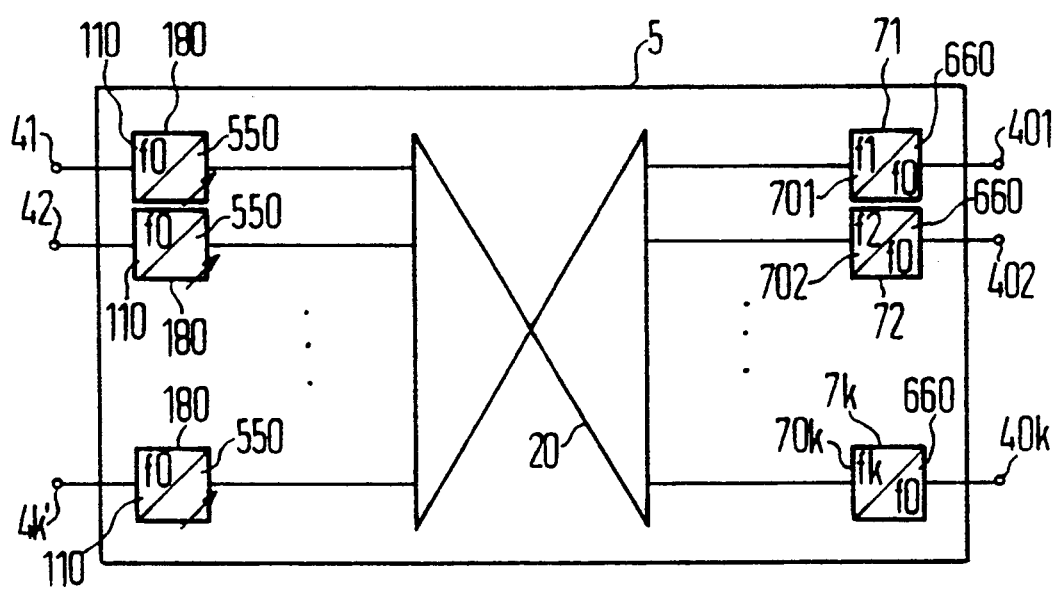

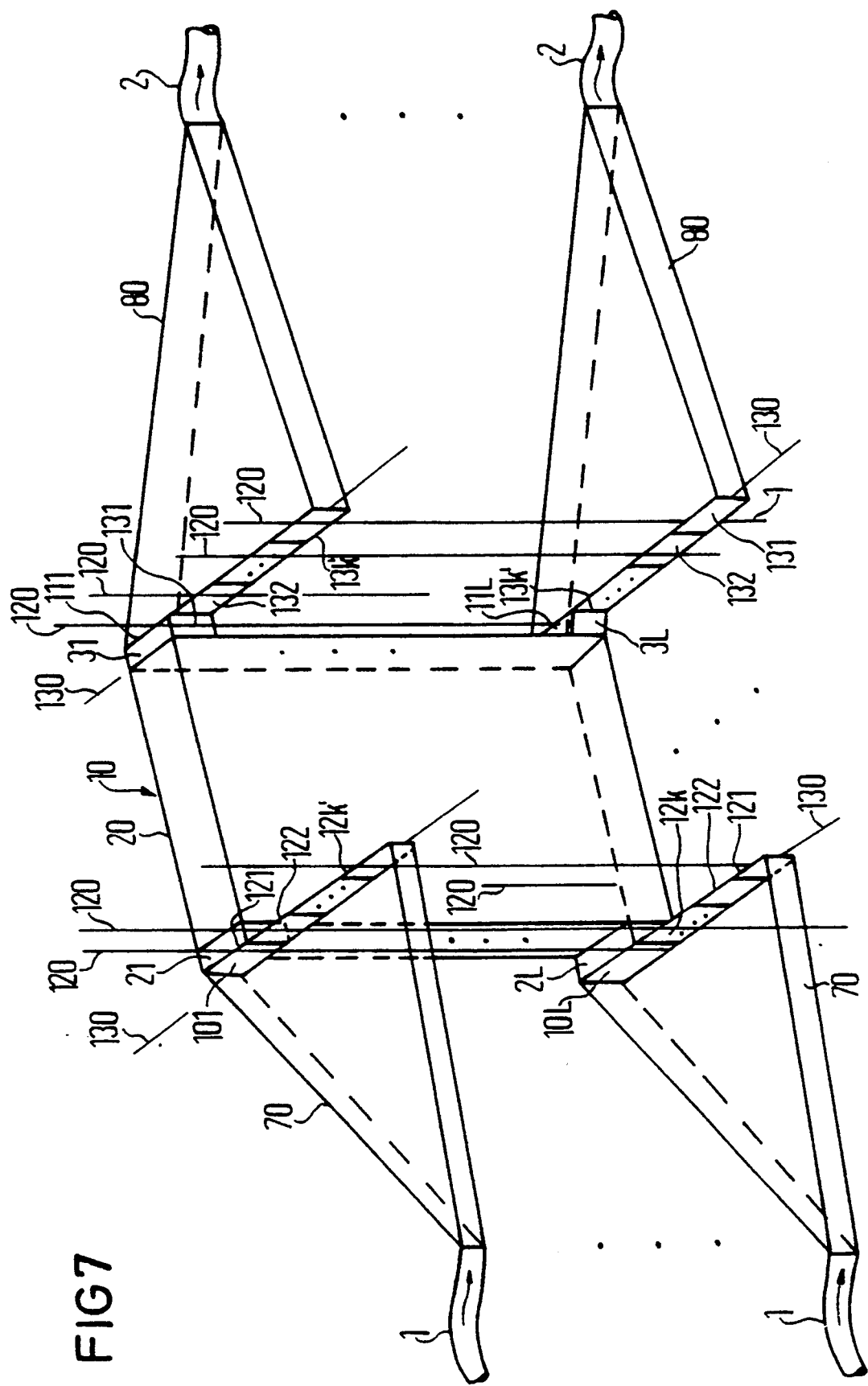

SWITCH MECHANISM FOR SWITCHING SIGNALS AT INPUTS ONTO OUTPUTS AND SWITCHING NETWORKS FOR INTERLINKING FIRST AND SECOND TRANSMISSION MEDIA

BACKGROUND OF THE INVENTION

The present invention is directed to a switch mechanism for switching signals from inputs to outputs thereof and is directed to switching networks for interlinking first and second transmission media.

Switching networks for interlinking a plurality of first transmission media with a plurality of second transmission media are known in the prior art.

For example, multi-stage switching networks composed of pure time stages are known from E. Hoelzler, H. Holzwart, "Pulstechnik", Vol. 2, Springer Verlag, 1984, page 378. Analogously thereto, such arrangements can be exclusively constructed of frequency stages in the OFDM optical frequency division multiplexing domain. An example of this is a known architecture by Fujiwara et al. (see M. Fujiwara et al., A Coherent Photonic Wavelength Division Switching System for Broadband Networks, Journal of Lightwave Technology, Vol. 8, No. 3, 1990, pages 416–422). This switching network is of the Clos type (see B.S.T.J., Vol. 32, pages 406–424) and the individual switch stages employ frequency-position interchangers. It is mainly complicated in that a switch between space-division and frequency-division multiplexing occurs far more often than necessary.

SUMMARY OF THE INVENTION

It is an object of the present invention to provide switching networks having a substantially simpler architecture than prior art switching networks.

In a first embodiment of the present invention the switch mechanism has a plurality of inputs and a plurality of outputs for switching signals supplied to the inputs onto the outputs, whereby every signal supplied to an input can be optionally switched to each output. Respectively one frequency from a plurality of different frequencies equal in number to the plurality of inputs selected from a plurality of predetermined, different frequencies is permanently allocated to each input on the basis of predetermined, fixed distribution of these selected frequencies onto the various outputs. A respective, singly adjustable frequency converter of the input side is provided per input. The frequency converter converts a signal on one of the various, predetermined frequencies supplied to this input into a signal corresponding to this signal on the selected frequency permanently allocated to this input only when this frequency converter of the input side is set to the predetermined frequency of this supplied signal. A means is provided for the power-associated distribution of each of the signals converted in terms of frequency onto the various outputs either individually and/or in a mix with one another. A doubly adjustable frequency converter of the output side is provided per output. The frequency converter selects a signal on one of the various, selected frequencies from the power part allocated to this output on the basis of the power-associated distribution of the signals only when this frequency converter of the output side is, optionally set to the selected frequency and converting the selected signal on this set, selected frequency into a signal corresponding to this selected signal on one of the various, predetermined frequencies onto which this frequency converter is optionally set.

In a second embodiment of the present invention the switch mechanism has a plurality of inputs and a plurality of outputs for switching signals supplied to the inputs onto the outputs, whereby every signal supplied to an input can be optionally switched to each output. Every output has a respective frequency from a plurality of different frequencies equal to the plurality of outputs selected from a plurality of predetermined, different frequencies permanently allocated to it on the basis of a predetermined, fixed distribution of these selected frequencies onto the various outputs. A doubly settable frequency converter of the input side is provided per input. The frequency converter selects a signal on the one of the various, predetermined frequencies supplied to this input only when this frequency converter of the input side is optionally set to the predetermined frequency of this supplied signal. The frequency converter converts the selected signal on this set, predetermined frequency into a signal corresponding to this selected signal on one of the various, selected frequencies to which, this frequency converter of the input side is optionally set. A means is provided for the power-associated distribution of each of the signals converted in terms of frequency onto the various outputs either individually and/or in a mix with one another is provided. A respective, adjustable frequency converter of the output side is provided per output. The frequency converter selecting a signal on the selected frequency permanently allocated to this output from the power part allocated to this output on the basis of the power-associated distribution of the signals only when the frequency of this signal coincides with the selected frequency permanently allocated to this output. The frequency converter converts this selected signal on this selected frequency into a signal corresponding to this selected signal on one of the various, predetermined frequencies to which this frequency converter of the output side is optionally set.

An advantage of the present invention is that these switch mechanisms can be identically fashioned and even must be identically fashioned to a certain extent, so that such a switching network can be essentially constructed with a single switch type, for example either with the type according to the first embodiment or with the type according to the second embodiment. However, such a switching network can also be constructed with both types, so that it contains both types.

The following are advantageous developments of the present invention. In a switch mechanism according to the first embodiment a frequency converter of the input side has a signal receiver optionally tunable to each of the various, predetermined frequencies for detecting a signal on the frequency to which the signal receiver is set at the moment. The frequency converter also has a signal transmitter for generating (dependent on this detected signal) a signal corresponding to this detected signal on the selected frequency that is permanently allocated to the input belonging to this frequency converter of the input side. A frequency converter of the output side has a signal receiver optionally tunable to each of the various, selected frequencies for detecting a signal on the selected frequency to which this signal receiver is tuned at the moment. This frequency converter also has a signal transmitter optionally settable to each of the predetermined frequencies for generating (dependent on this detected signal on this selected frequency) a signal corresponding to this detected signal on the predetermined frequency to which this signal transmitter is set at the moment.

In a switch mechanism according to the second embodiment, a frequency converter of the input side has a signal receiver optionally tunable to each of the various, predetermined frequencies for selecting a signal on the frequency to which the signal receiver is tuned at the moment. The frequency converter also has a signal transmitter settable to each of the selected frequencies for generating (dependent on this detected signal on this predetermined frequency) a signal corresponding to this selected signal on the selected frequencies to which this signal transmitter is set at the moment. A frequency converter of the output side has a signal receiver tuned to the selected frequency permanently allocated to the output belonging to this frequency converter for detecting a signal on this selected frequency. This frequency converter also has a signal transmitter optionally settable to each of the predetermined frequencies for generating (dependent on this detected signal on this selected frequency) a signal corresponding to this detected signal on the predetermined frequency to which this signal transmitter is set at the moment.

The present invention is also a switching network for interlinking a plurality of first transmission media to an identical plurality of second transmission media with a plurality of switch mechanism according to the above-described embodiments whereby every first transmission medium and every second transmission medium is provided for transmitting signals on a plurality of predetermined, different frequencies. A respective means of the input side is provided per first transmission medium This means has an input and a plurality of outputs equal to the plurality of switch mechanism for the power-associated distribution of every signal supplied to the input of this means on the first transmission medium onto the outputs of this means. Each of the switch mechanisms has a plurality of inputs equal to the plurality of transmission media and has the same plurality of outputs. The selected frequencies are distributed onto the inputs in the same, predetermined distribution in all switch mechanisms. A respective means of the output side is provided per second transmission medium. This means has a plurality of inputs equal to the plurality of switch mechanisms and has an output for the transmission of signals supplied to these inputs onto the output of this means to which said second transmission medium is connectable. The outputs of every means of the input side are connected to all switch mechanisms such that every output of the means of the input side is connected to an input of a switch mechanism and every input of every switch mechanism is connected to an output of the means of the input side. The inputs of every means of the output side are connected to all switch mechanisms such that every input of this means of the output side is connected to an output of a switch mechanism and every output of every switch mechanism is connected to an input of a means of the output side.

This switching network is constructed with switch mechanisms of the present invention and is designed for signal transmission on the transmission media in frequency-division multiplex and is distinguished by its extraordinary simplicity.

The present invention is also a switching network for interlinking a plurality of first transmission media to an identical plurality of second transmission media with a plurality of switch mechanisms according to the above-described embodiments, whereby every first transmission medium and every second transmission medium has a plurality of channels equal to the plurality of predetermined frequencies for the transmission of spatially separated signals on a common carrier frequency. A respective switch means of the input side is provided per first transmission medium. The switch means has a plurality of inputs equal to the plurality of channels and has a plurality of outputs equal to the plurality of switch mechanisms. Each of these switch means of the input side is fashioned such that each of the inputs of every switch means of the input side has a respective, predetermined frequency permanently allocated to it on the basis of a distribution of the various, predetermined frequencies predetermined for this switch means of the input side. Every signal on the common carrier frequency supplied to an input of every switch means of the input side can be transformed into a signal corresponding to this signal on the predetermined frequency permanently allocated to this input and can be distributed in terms of power onto the outputs of this switch means of the input side either individually and/or in a mix with one another. A respective switch means of the output side is provided per second transmission medium. The switch means has a plurality of inputs equal to the plurality of switch mechanisms and having a plurality of outputs equal to the plurality of channels. Each of these switch means of the output side is fashioned such that every signal on one of the various, predetermined frequencies supplied to an input of this switch means of the output side can be distributed in terms of power onto the outputs of this switch means either individually and/or in a mix with one another. Every output of this switch means of the output side has one of the predetermined frequencies permanently allocated to it on the basis of a distribution of the various, predetermined frequencies predetermined for this switch means of the output side. Also, a signal on the predetermined frequency permanently allocated to the output can be selected from the power part allocated to each output of every switch means of the output side on the basis of the power-associated distribution of the signals and can be transformed into a signal on the common carrier frequency corresponding to this signal. The outputs of every switch means of the input side are connected to all switch mechanisms such that every output of this switch means of the input side is connected to an input of a switch mechanism and every input of every switch mechanism is connected to an output of a switch means of the input side. The inputs of every switch means of the output side are connected to all switch mechanisms such that every input of every switch means of the output side are connected to all switch mechanisms such that every input of this switch means of the output side is connected to an output of a switch mechanism and every output of every switch mechanism is connected to an input of a switch means of the output side.

This switching network is constructed with switch mechanisms of the present invention and is designed for signal transmission on transmission media in space-division multiplex and is likewise constructed in an extremely simple way, particularly in comparison to a known three-stage switching network for space-division multiplex of the Clos type. The following are advantageous developments of this switching network of the present invention.

The switch means of the input side has a frequency converter of the input side per input of this switch means of the input side for converting a signal on the common carrier frequency supplied to this input into a signal corresponding to this signal on the predetermined frequency permanently allocated to this input, and has a means for the power-associated distribution of every signal brought onto a predetermined frequency by the frequency converter of the input side onto the outputs of this switch means of the input side.

The frequency converter of the input side has a signal receiver tuned to this common carrier frequency for detecting a supplied signal on the carrier frequency, and has a signal transmitter for generating (dependent on the detected signal on this carrier frequency) a signal corresponding to this detected signal on the predetermined frequency permanently allocated to the input of the switch means of the input side belonging to this frequency converter of the input side.

The switch means of the output side has a means for the power-associated distribution of every signal on each of the various, predetermined frequencies supplied to an input of this switch means of the output side onto the outputs of this switch means of the output side. This switch means also has a respective frequency converter per output of this switch means of the output side for the reception of a power part allocated to this output by the power-associated distribution of the signals, for selecting a signal on the predetermined frequency permanently allocated to this output from the allocated power part and for transforming this selected signal on this frequency into a signal corresponding to this signal on the common carrier frequency.

The frequency converter of the output side has a signal receiver tuned to the predetermined frequency permanently allocated to the output of the switch means of the output side belonging to this frequency converter of the output side for detecting a supplied signal on this predetermined frequency and has a signal transmitter for generating (dependent on the detected signal on this predetermined frequency) a signal corresponding to this detected signal on the common carrier frequency.

Furthermore, the present invention is yet another switching network for interlinking a plurality of first transmission media with an identical plurality of second transmission media, whereby every first transmission medium and every second transmission medium respectively has the same number of spatially separated channels for the spatially separate transmission of signals on a common carrier frequency. This switching network ha a plurality of first switch means equal to the plurality of the first transmission media, each of the first switch means being allocated to exactly one transmission medium. Each first switch means has a plurality of inputs equal to the plurality of the channels of the allocated, first transmission medium for respectively one of these channels, and also has an equal plurality of outputs for all first switch means. Every first switch means is fashioned such that every signal adjacent at one of its inputs can be optionally switched onto each of its outputs. A plurality of second switch means is equal to the plurality of outputs of the first switch means. Each of the second switch means has a plurality of inputs equal to the plurality of first transmission media and, also has the same plurality of outputs. Every second switch means is fashioned such that every signal adjacent at one its inputs can be optionally switched on each of its outputs. A plurality of third switch means is equal to the plurality of second transmission media. Each of the third switch means is allocated to exactly one second transmission medium. Every third switch means has a plurality of inputs equal to the plurality of second switch means and also has a plurality of outputs equal to the plurality of channels of the allocated, second transmission medium. Every third switch means is fashioned such that every signal adjacent at one of its inputs can be optionally switched onto each of its outputs. The outputs of every first switch means are connected to all second switch means such that every output of this first switch means is connected to an input of every second switch means and every input of every second switch means is connected to an input of a first switch means. The inputs of every third switch means are connected to all second switch means such that every input of this third switch means is connected to an output of every second switch means. Every output of the second switch means is connected to an input of a third switch means. First, second and third switch means are formed of shared-medium switches, whereby the shared-medium switch of the first and second switch means operates according to the principle of a distribution and selection of predetermined frequencies and the shared-medium switch of the third switch means operates according to the principle of an addressing of predetermined frequencies. The following are advantageous developments of this switching network.

The first switch means is formed of a shared-medium switch, whereby every input of this first switch means has a respective frequency from a plurality of predetermined frequencies differing from one another and equal in plurality to the plurality of channels firmly allocated to it on the basis of a distribution of these predetermined frequencies onto the inputs of this first switch means predetermined for this first switch means. Every signal on the common carrier frequency supplied to this input can be transformed onto the frequency permanently allocated to this input and can be distributed either individually and/or in a mix with one another onto the outputs of this first switch means in terms of power. A signal on a frequency selectable from the various, predetermined frequencies can be selected at each of these outputs from a power part allocated to this output by the power-associated distribution of the signals and this selected signal on this frequency can be transformed onto the common carrier frequency.

The second switch means is formed of a shared-medium switch, wherein every input of this second switch means has a respective frequency from a plurality of frequencies selected from a plurality (said plurality being equal to the plurality of inputs of this second switch means) of different, predetermined frequencies that are different from one another and equal in plurality to the plurality of channels permanently allocated to it on the basis of a distribution of the selected frequencies onto the inputs predetermined for this second switch means. Every signal on the common carrier frequency supplied to this input can be transformed onto the frequency permanently allocated to this input and can be distributed in terms of power onto the outputs of this second switch means either individually and/or in a mix with one another. A signal on a frequency freely selectable from the various, selected frequencies can be selected at each of these outputs from a power part allocated to this output by the power-associated distribution of the signals and this selected signal can be transformed onto the common carrier frequency.

The third switch means is formed of a shared-medium switch, wherein the signals on the common carrier frequency supplied to various inputs of this third switch means can be transformed in freely selectable fashion onto every frequency from a plurality of different, predetermined frequencies equal in plurality to the plurality of channels.

Each signal transformed onto one of these predetermined frequencies can be distributed in terms of power onto the outputs of this third switch means either individually and/or in a mix with one another. A signal on a frequency from the various, predetermined frequencies permanently allocated to this output on the basis of a distribution of the predetermined frequencies onto the outputs of this third switch means which is predetermined for this third switch means can be selected at each of these outputs from a power part allocated to this output by the power-associated distribution of the signals and this selected signal can be transformed onto the common carrier frequency.

The shared-medium switch of a first or second switch means has a respective frequency converter of the input side per input of this first or second switch means for the reception of a signal on the common carrier frequency supplied to this input and for converting this signal into a corresponding signal on the frequency permanently allocated to this input from the various, predetermined or selected frequencies. It also has a means for the power-associated distribution of each of these signals transformed onto the various, predetermined or selected frequencies onto the outputs of this first or second switch means. It further has a frequency converter of the output side selectively tunable to each of the various predetermined or selected frequencies per output of this first or second switch means for the reception of the power part allocated to this output on the basis of the power-associated distribution of the signals, for selecting a signal from this power part on a frequency to which the frequency converter of the output side is tuned at the moment, and for converting this selected signal on this frequency into a corresponding signal on the carrier frequency.

The frequency converter at the input side of the shared-medium switch of a first or second switch means has a signal receiver tuned to the common carrier frequency for detecting a signal on this carrier frequency, and also has a signal transmitter for generating (dependent on the detected signal) a signal corresponding to the detected signal on the carrier frequency on the frequency permanently allocated to the input belonging to this frequency converter.

The frequency converter at the output side of the shared-medium switch of a first or second switch means has a signal receiver selectively tunable to each of the various, predetermined frequencies for detecting a signal on the frequency to which the signal receiver is tuned at the moment, and also has a signal transmitter for generating (dependent on the detected signal) a signal on the common carrier frequency which corresponds to this detected signal on this frequency.

The shared-medium switch of a third switch means has a respective, adjustable frequency converter of the input side per input for the reception of a signal on the common carrier frequency supplied to this input and for converting this signal onto a frequency freely selectable from the various, predetermined frequencies for this input. It also has a means for the power-associated distribution of each of these signals transformed onto the various, predetermined frequencies onto the outputs of this third switch means. It further has a respective frequency converter of the output side per output of this third switch means for the reception of the power part allocated to this output on the basis of the power-associated distribution of the signals and for selecting a signal from this power part on a frequency permanently allocated to this output on the basis of the predetermined, fixed distribution of the various frequencies onto the outputs of this third switch means and for converting this selected signal into a corresponding signal on the common carrier frequency.

The frequency converter at the input side of the shared-medium switch of a third switch means has a signal receiver tuned to the common carrier frequency for detecting a signal on this carrier frequency, and also has a signal transmitter freely settable to each of the various, predetermined frequencies for generating (dependent on the detected signal) a signal corresponding to the detected signal on the carrier frequency on the predetermined frequency to which this signal transmitter is set at the moment.

The frequency converter at the output side of the shared-medium switch of the third switch means has a signal receiver tuned to the frequency permanently allocated to the output belonging to this frequency converter for detecting a signal on this fixed frequency, and also has a signal transmitter for generating (dependent on the detected signal) a signal on the common carrier frequency that corresponds to the detected signal on the fixed frequency.

All switching networks of the invention have the advantage that, despite their substantially simpler architecture, they exhibit all advantages of the known, multistage switching networks of the Clos type, particularly the property that internal blockings are precluded under the condition $k' \leq 2k-1$. In particular, the orthogonal topology for the interconnection of stages or circuit parts that proceeds from Donald K. Wilson, A new Architecture for Packaging Wide Communication Equipment Using a 3D, Orthogonal Edge—two Edge Topology, IEEE, 1988, pages 3.5.1 through 13.6.1, can be realized in a simple way in them.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures in which like reference numerals identify like elements, and in which:

FIG. 3 depicts an inventively constructed switching network constructed with shared-medium switches;

FIGS. 4 and 5 depict embodiments of the shared-medium switch of every first and second switch equipment, respectively, of the switching network according to FIG. 3;

FIG. 6 depicts an embodiment of the shared-medium switch of every third switch equipment of the switching network according to FIG. 3; and FIG. 7 is a perspective illustration of a switching network according to FIG. 1 having orthogonal topology for coupling the equipment of the input and output sides to the equipment for power-associated distribution of the signals.

DESCRIPTION OF THE PREFERRED EMBODIMENT

Optionally adjustable signal receivers and signal transmitters are identified in FIGS. 1–6 by an obliquely upwardly directed arrow. In the case of signal receivers and signal transmitters having a permanently assigned frequency f0, f1, f2, . . . ,fL, this frequency is entered.

Figure 1:
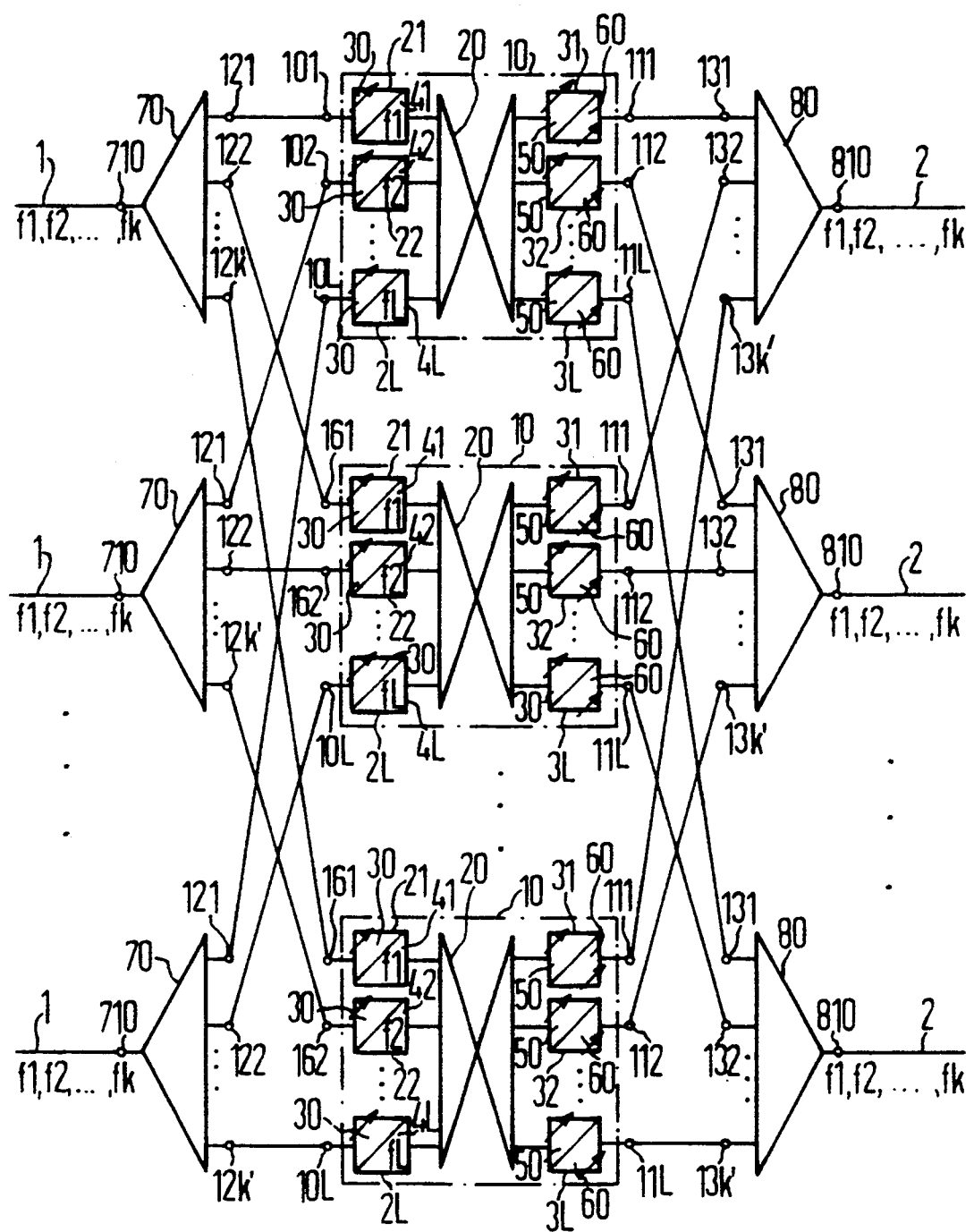
FIG. 1 depicts a switching network constructed with switch mechanisms of the present invention according to one embodiment for interlinking first and second transmission media in frequency-division multiplex.
Figure 2:
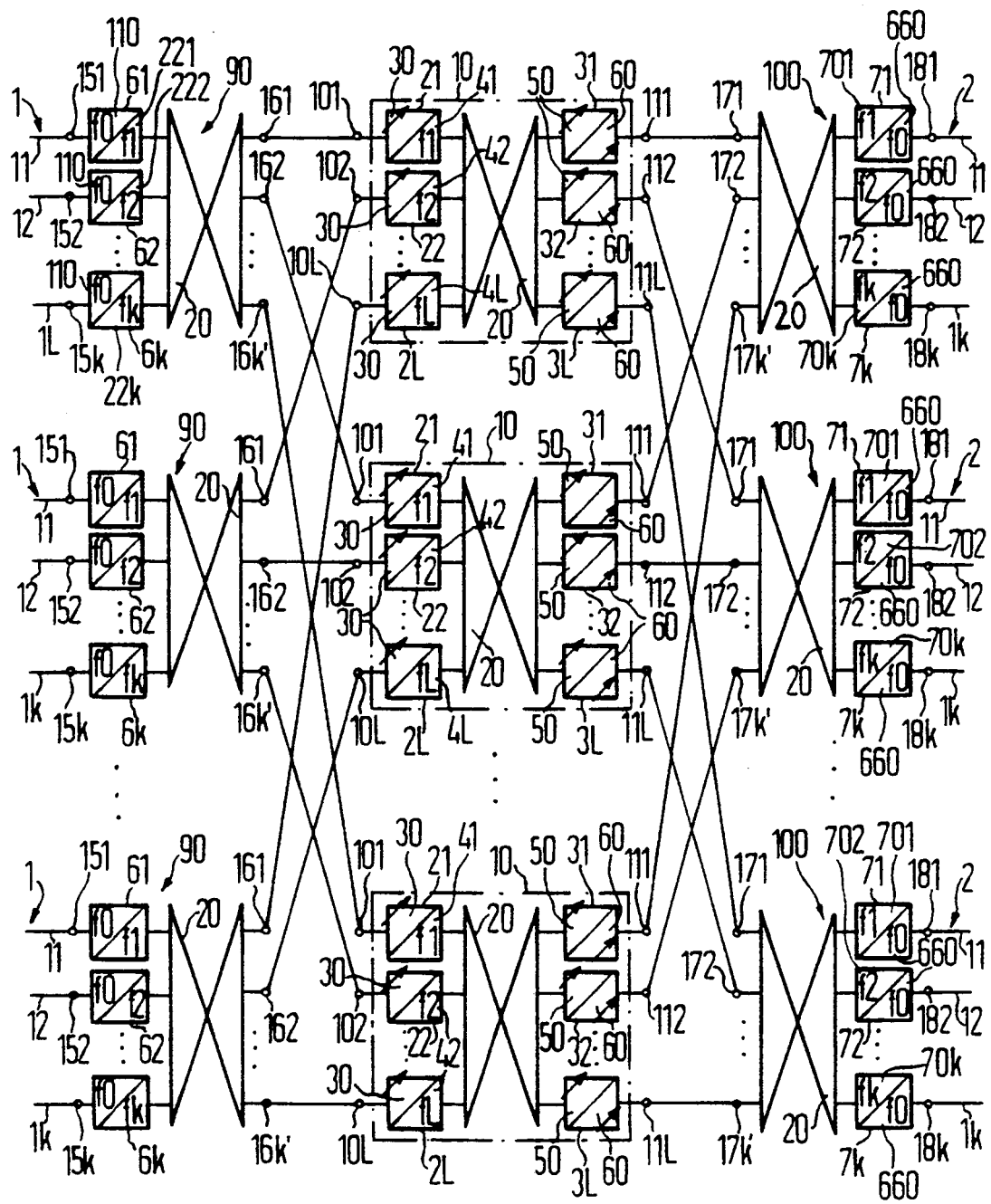
FIG. 2 depicts a switching network constructed with switch mechanisms of the present invention according to one embodiment for interlinking first and second transmission media in space-division multiplex.

Every switching network according to FIG. 1 and 2 is constructed with a plurality of identically fashioned switch mechanisms 10 of the present invention according to a first embodiment; these shall be set forth first.

Every switch mechanism 10 comprises L=1, 2, 3, . . . inputs 101 through 10L and L outputs 111 through 11L. Respectively one frequency of L different frequencies selected from a plurality k>L predetermined, different frequencies is permanently allocated to each input on the basis of a predetermined, fixed distribution of these selected frequencies onto the different inputs of this switch mechanism 10.

In the example of FIGS. 1 and 2, the frequencies f1, f2, . . . , fL are specifically selected and are distributed in this sequence onto the different inputs 101, 102, . . . , 10L, so that the selected frequency f1 is permanently allocated to the input 101, the selected frequency f2 is permanently allocated to the input 102, etc., and, finally, the selected frequency fL is permanently allocated to the input 10L.

The present invention is not limited to this specific selection and distribution of the selected frequencies onto the inputs. The selected frequencies can be any desirable subset composed of L different, predetermined frequencies selected from the total set of predetermined frequencies f1, f2, . . . , fk. Likewise, the predetermined distribution of the L selected frequencies onto the different inputs can be selected as desired.

Respectively singly adjustable frequency converter 21, 22, . . . , 2L of the input side is provided per input 101 through 10L. This frequency converter converts a signal supplied to this input on an arbitrary frequency of the predetermined frequency f1 through fk into a signal identical to this signal on the fixed frequency allocated to this input when this frequency converter of the input side is set to the predetermined frequency of this supplied signal.

A means for power-wise distribution of every one of the signals converted in terms of frequency by a frequency converter 21 through 2L of the input side onto the various outputs 111 through 11L is referenced 20.

This means 20, for example, can be a star coupler or signal mixer.

A respective, doubly adjustable frequency converter 31, 32, . . . , 3L of the output side is provided per output 111 through 11L. This frequency converter selects one signal on one of the various, selected frequencies from the power part allocated to this output on the basis of the power-associated distribution of the signals only when this frequency converter of the output side is optionally set, on the one hand, to this selected frequency and that converts the selected signal on this set, one selected frequency into a signal identical to this selected signal on one of the various, predetermined frequencies f1 through fk to which this frequency converter of the output side, on the other hand, is optionally set at the moment.

Every frequency converter 21 through 2L of the input side is preferably fashioned such that it comprises a signal receiver 30 optionally tunable to each of the various, defined frequencies f1 through fk for detecting a signal on the frequency to which the signal receiver 30 is tuned at the moment. It also comprises a signal transmitter 41, 42, . . . , 4L that, dependent on this detected signal, generates an identical signal on the selected frequency that is permanently allocated to the input belonging to this frequency converter of the input side.

Every frequency converter 31 through 3L of the output side is fashioned such that it comprises a signal receiver 50 optionally tunable to each of the various, selected frequencies for detecting a signal on the selected frequency to which this signal receiver 50 is tuned at the moment. It also comprises a signal transmitter 60 optionally settable to each of the predetermined frequencies f1 through fk that, dependent on this detected signal on this selected frequency, generates a signal identical to this detected signal on the predetermined frequency to which this signal transmitter is set at the moment.

Figure 1A:
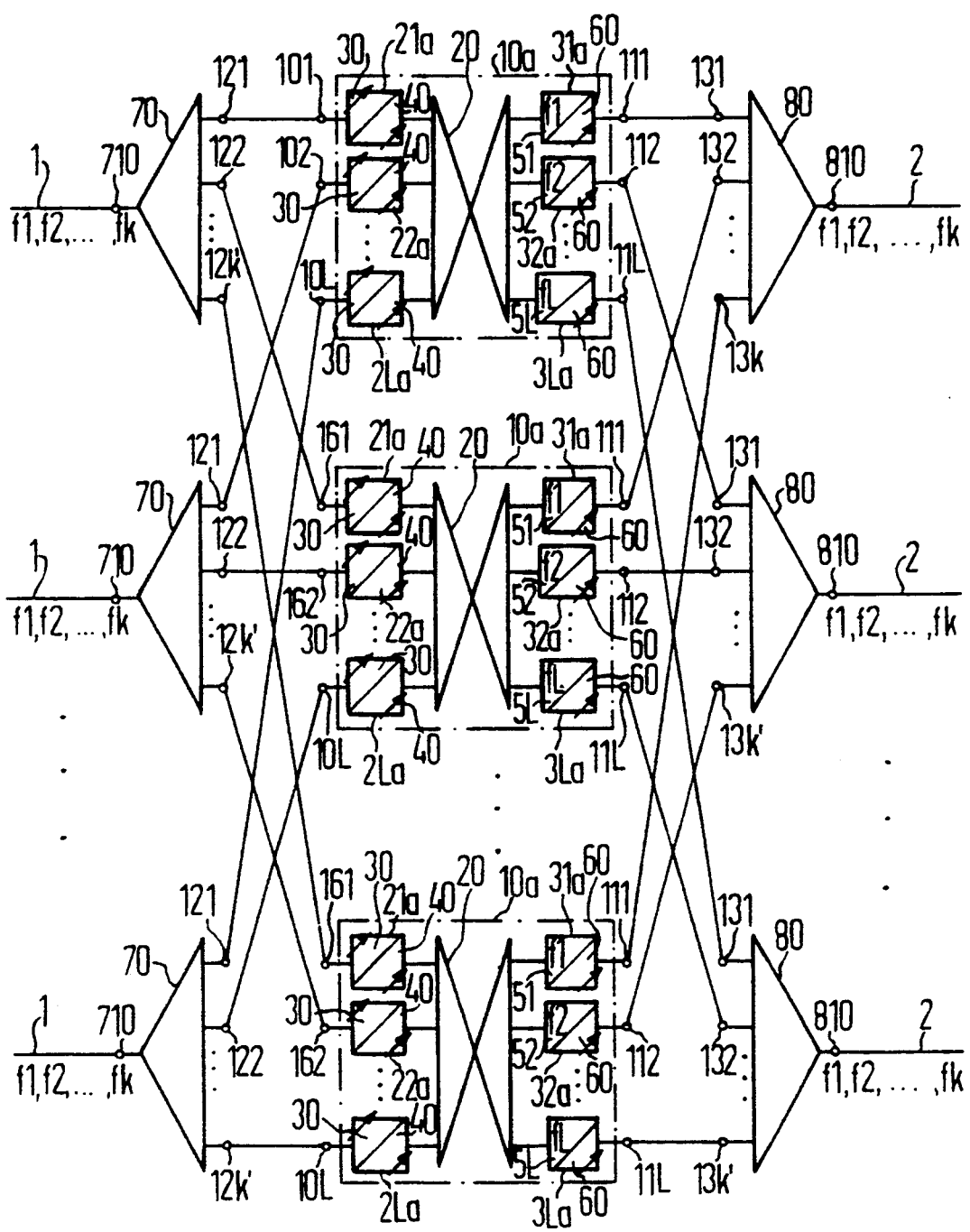
FIG. 1a depicts a switching network constructed with switch mechanisms of the present invention according to another embodiment for interlinking first and second transmission media in frequency-division multiplex.
Figure 2A:
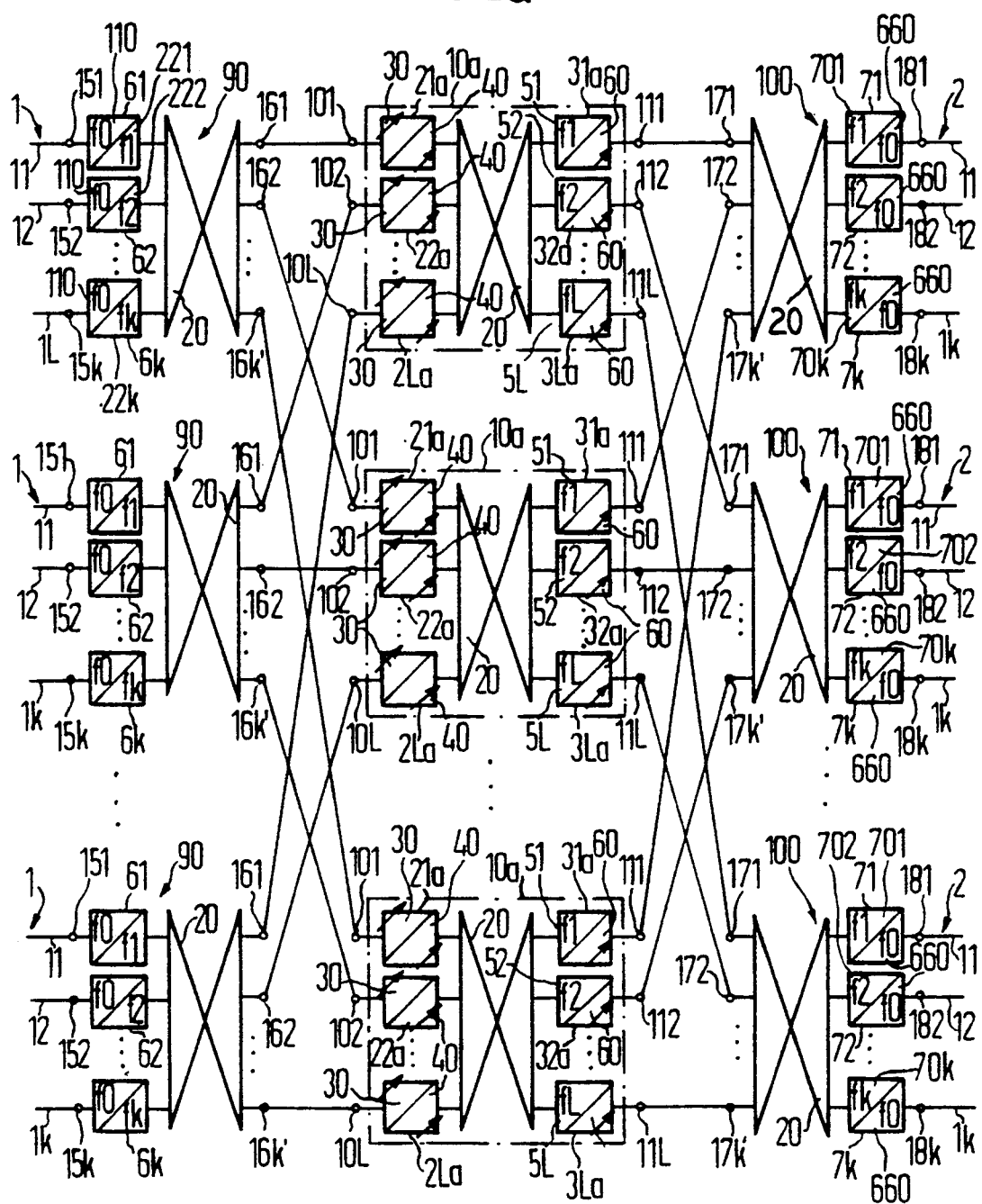
FIG. 2a depicts a switching network constructed with switch mechanisms of the present invention according to another embodiment for interlinking first and second transmission media in space-division multiplex.

Every switching network of FIGS. 1a and 2a differs from the switching network of FIG. 1 or FIG. 2 only in that identically fashioned switch mechanisms 10a are employed instead of the switch mechanisms 10.

Every switch mechanism 10a comprises L=1, 2, 3, . . . inputs 101 through 10L and L outputs 111 through 11L. Differing from the switch mechanism 10, respectively one frequency of L different frequencies selected from a plurality of k>L predetermined different frequencies on the basis of a predetermined, fixed distribution of these selected frequencies onto the various outputs of this switch mechanism 10a is permanently allocated to every output.

In the example of FIGS. 1a and 2a, the frequencies f1, f2, . . . , fL are specifically selected and are distributed in this sequence onto the various outputs 111, 112, . . . , 11L, so that the selected frequency f1 is permanently allocated to the output 111, the selected frequency f2 is permanently allocated to the output 112, etc., and, finally, the selected frequency fL is permanently allocated to the output 11L.

The present invention is not limited to this specific selection and distribution of the selected frequencies onto the outputs. The selected frequencies can be any desirable subset composed of L different, predetermined frequencies from the total set of predetermined frequencies f1, f2 . . . , fk. Likewise, the predetermined distribution of the L selected frequencies onto the various outputs can be selected as desired.

A respective doubly settable frequency converter 21a, 22a, ..., 2aL of the input side is provided per input 101 through 10L of the switch mechanism 10a. This frequency converter selects a signal supplied to this input 101 through 10L on any arbitrary frequency of the predetermined frequencies f1 through fk only when this frequency converter 21a through 22a of the input side is optionally set, on the one hand, to the predetermined frequencies f1 through fk of this supplied signal and converts the selected signal on this set, predetermined frequency into a signal corresponding to this selected signal on one of the various, selected frequencies f1 through fL to which, on the other hand, this frequency converter 21a through 2La of the input side is optionally set.

A means for power-associated distribution of each of the signals converted in terms of frequency by a frequency converter 21a through 2La of the input side onto various outputs 111 through 11L is referenced 20. This means 20, for example, can be a star coupler or signal mixer.

A singly adjustable frequency converter 31a, 32a, ... 3La of the output side is provided per output 111 through 11L. This frequency converter selects a signal from the power part allocated to this output on the basis of the power-associated distribution of the signals on the selected frequency permanently allocated to this output when the frequency of this signal coincides with the selected frequency permanently allocated to this output. This frequency converter of the output side converts this selected signal on this selected frequency into a signal corresponding to or identical to this selected signal on one of the various, predetermined frequencies f1 through fk to which, on the other hand, this frequency converter of the output side is optionally set at the moment.

Every doubly adjustable frequency converter 21a through 2La of the input side is preferably fashioned such that it comprises a signal receiver 30 tunable to each of the various, specific frequencies f1 through fk for detecting a signal on the frequency to which the signal receiver 30 is tuned at the moment. It also comprises a signal transmitter 40 optionally adjustable to each of the selected frequencies that, dependent on this detected signal on this predetermined frequency, generates an identical signal on the selected frequency to which this signal transmitter 40 is set at the moment.

Every frequency converter 31a through 3La of the output side is fashioned such that it comprises a signal receiver 51 through 5L tuned to the selected frequency permanently allocated to this output belonging to this frequency converter for detecting a signal on this selected frequency. It also comprises a signal transmitter 60 optionally settable to each of the predetermined frequencies f1 through fk that, dependent on this detected signal on this selected frequency, generates a signal identical to this detected signal on the predetermined frequency to which this signal transmitter is set at the moment.

The simply constructed switching networks for interlinking a maximum of L first transmission media and a maximum of L second transmission media can be advantageously constructed with switch mechanisms 10 and 10a of the present invention. When fewer than L first transmission media and/or fewer than L second transmission media are to be interlinked, the switch mechanisms having L inputs and L outputs can likewise be well-employed in that the number of inputs and outputs used coincides with the number of first or second transmission lines that are present and the remaining inputs and outputs remain unused or are omitted.

The switching network of FIG. 1 or FIG. 1a is intended for L first and L second transmission media 1 and 2 on which signals are transmitted in frequency-division multiplex, namely on the k=1, 2, 3, ... different, predetermined frequencies f1, f2, ..., fk and is constructed with k'=1, 2, 3 ... of such switch mechanisms 10 or 10a of the present invention, each having respectively L inputs and L outputs. In this switching network of FIG. 1, respectively one means 70 of the input side is provided per first transmission medium, said means 70 having an input 710 and having a plurality k' of outputs 121, 122, ..., 12k' equal to the plurality k' of switch mechanism 10 or 10a for the power-associated distribution of each signal supplied to the inputs 710 of this means 70 on this first transmission medium 1 onto the outputs 121 through 12k' of this means 70.

As already indicated each of the k' switch mechanisms 10 or 10a comprises the same number of inputs 101 through 10L and the same number of outputs 111 through 11L as the number of first or second transmission media 1 or 2 that are present, i.e. respectively L inputs and respectively L outputs.

Moreover, the same L selected frequencies are to be selected for all k' switch mechanisms 10 or 10a, whereby, moreover, the predetermined distribution of these selected frequencies onto the various inputs per switch mechanism 10 or 10a is to be selected the same in all k' switch mechanisms 10 or 10a. In the example of FIG. 1 or 1a, the selected frequencies f1, f2, ..., fL are selected, these being distributed in all k' switch mechanisms 10 or 10a in, for example, this sequence onto the inputs 101, 102, or respectively, 10L. One respective means 80 of the output side is provided per second transmission medium. This means 80 has a plurality k' of inputs 131, 132, ..., 13k' equal to a plurality k' of the switch mechanisms 10 or 10a and one output 810 for transmitting signals supplied to these inputs 131 through 13k' onto the output 810 of this means 80, whereby this second transmission medium 2 can be connected to this output 810.

The outputs 121, 122, ..., 12k' of every means 70 of the input side are connected to all k' switch devices 10 or 10a such that every output of this means 70 of the input side is connected to an input of a switch means 10 or 10a and every input of every switch means 10 or 10a is connected to an output of the means 70 of the input side, for example as indicated in FIG. 1 or 1a.

The inputs 131, 132, ..., 13k' of each means 80 of the output side are connected to all switch mechanisms 10 or 10a such that each of these inputs is connected to an output 111 through 11L of a switch mechanism 10 or 10a and every output of every switch mechanism 10 or 10a is connected to an input of a means 80 of the output side, for example as shown in FIG. 1 or 1a.

The switching network of FIG. 2 or 2a is intended for L first and L second transmission media 1 and 2 on which signals are transmitted in space-division multiplex. To that end, every first and every second transmission medium 1 or 2 each respectively comprises a plurality k of channels 11, 12, ... 1k equal to the plurality k of pre-determined frequencies f1 through fk for transmitting signals separated in terms of space on a common carrier frequency f0.

The switching network of FIG. 2 or 2a differs from the switching network of FIG. 1 or 1a only in that every means 70 of the input side in the switching network of FIG. 1 or FIG. 1a is replaced in the switching network of FIG. 2 or 2a by a switch means 90 of the input side. Every means 80 of the output side in the switching network of FIG. 1 or 1a is replaced by a switch mechanism 100 of the output side in the switching network of FIG. 2 or 2a. Everything else in the two switching networks according to FIG. 1 or 1a and FIG. 2 or 2a is identical.

Every switch means 90 of the input side comprises a plurality k of inputs 151, 152, . . . , 15k equal in number to the plurality k of channels and comprises a plurality k' of outputs 161, 162, . . . , 16k' equal to the plurality k' of switch mechanisms 10 or 10a. Every switch means 90 is fashioned such that respectively one of the predetermined frequencies is permanently allocated to each of the inputs 151 through 15k on the basis of a distribution of the various, predetermined frequencies f1 through fk predetermined for this switch means 90 of the input side. Every signal supplied to an input 151 through 15k by the common carrier frequency f0 can be transformed into a second identical to this signal on the frequency permanently allocated to this input and can be distributed in terms of power onto the outputs 161 through 16k'. The distribution of the predetermined frequency f1 through fk onto the various inputs 151 through 15k of each switch means 90 of the input side can be identically selected for all of the switch means 90 or can be individually selected for each switch means 90 and, thus, can also be selected differently from one another. In FIG. 2, for example, the predetermined frequencies f1, f2, . . . , fk at each switch means 90 of the input side are distributed in this sequence onto the inputs 151, 151, . . . , or 15k and, thus, are distributed in the same way in all of these switch means 90.

The k' outputs 161 through 16k' of every switch means 90 of the output side are connected to all k' switch mechanisms 10 or 10a in exactly the same way as the outputs 121 through 12k' of every means 70 of the input side in the switching network of FIG. 1 or 1a.

Every switch means 100 of the output side comprises a plurality k' of inputs 171, 172, . . . , 17k' equal to the plurality k' of switch mechanisms 10 or 10a. Every switch means 100 comprises a plurality k of outputs 181, 182, . . . , 18k equal to the number k of channels and is fashioned such that every signal supplied to an input 171 through 17k' on one of the various, predetermined frequencies f1 through fk can be distributed in terms of power onto the outputs 181 through 18k. One of the various, predetermined frequencies is permanently allocated to every output on the basis of a distribution of the various, predetermined frequencies f1 through fk predetermined for this switch means 100 of the output side. A signal on the predetermined frequency permanently allocated to this output can be selected from the power part distributed to every output 181 through 18k of every switch means 100 of the output side on the basis of the power-associated distribution of the signals and can be transformed into a signal identical to this signal on the common carrier frequency f0.

The k' inputs 171 through 17k' of every switch means 100 of the output side are connected to all switch means 10 or 10a in exactly the same way as the inputs 131 through 13k' of every means 80 of the output side in the switching network of FIG. 1 or 1a.

Every switch means 90 of the input side preferably comprises a respective frequency converter 61, 62, . . . , 6k of the input side per input 151, 152 .. . . , 15k for converting a signal supplied to this input on the common carrier frequency f0 into a signal identical to this signal on the predetermined frequency permanently allocated to this input. Every switch means 90 also comprises a means 20 for the power-associated distribution of every signal brought onto a predetermined frequency by a frequency converter 61, 62, . . . , 6k of the input side onto the outputs 161 through 16k' of this switch means 90 of the input side.

Every frequency converter 61 through 6k of the input side in the switch means 90 of the input side preferably comprises a signal receiver 110 tuned to the common carrier frequency f0 for detecting a supplied signal on this carrier frequency f0 and comprises a signal transmitter 221, 222, . . . , 22k that, dependent on the detected signal on this carrier frequency f0, generates a signal identical to this detected signal on the predetermined frequency permanently assigned to the input 151, 152, . . . , or 15k. Every switch means 100 of the output side preferably comprises a means 20 for the power-associated distribution of every signal supplied to an input 171 through 17k of this switch means 100 of the output side on each of the various, predetermined frequencies f1 through fk' onto the outputs 181 through 18k of this switch means 100 of the output side. Every switch means 100 also comprises a respective frequency converter 71, 72, . . . or 7k per output 181, 182, . . . , or 18k of this switch means 100 of the output side for the reception of a power part allocated to this output on the basis of the power-associated distribution of the signals. This is for selecting a signal on the predetermined frequency permanently allocated to this output from the power part allocated thereto and for transforming this selected signal on this frequency into a signal corresponding to this signal on the common carrier frequency f0.

Every frequency converter 71 through 7k of the output side thereby preferably comprises a respective signal receiver 701, 702, . . . or 70k tuned to the predetermined frequency permanently allocated to the output of the switch means 100 of the output side belonging to this frequency converter of the output side for detecting a supplied signal on this predetermined frequency. It also comprises a signal transmitter 660 that, dependent on the detected signal on this predetermined frequency, generates a signal identical to this detected signal on the common carrier frequency f0.

The switching networks of FIGS. 1 or 1a and 2 or 2a essentially combine all active components in the middle to the switch mechanisms 10 or 10a of the present invention, these being identical to one another, so that the entire arrangement can be constructed with a single component type. Over and above this, this component need be available only for a single stage and, therefore, k' times.

A switching network of the invention according to FIG. 1 or 1a having the special characteristic k=k'=L is a switching network of the Clos type of Fujiwara that is greatly reduced in components.

The switching network shown in the form of a block circuit diagram in FIG. 3 for interlinking a plurality L of first transmission media 1 to an identical plurality L of second transmission media is a three-stage switching network of the Clos type. Every first transmission medium and every second transmission medium 2 respectively comprises the same number k of spatially separated channels 11, 12 . . . , 1k for the spatially separated transmission of channels on a common carrier frequency f0.

This switching network comprises a plurality L of first switch means 3 equal to the plurality L of the first transmission media 1, each of said first switch means 3 being allocated to exactly one transmission medium 1. Every first switch means 3 comprises a plurality k of inputs 21, 22 . . . 2k for respectively one of these channels 11, 12, . . . or 1k equal in number to the plurality k of channels of the allocated, first transmission medium 1 and a plurality k' of outputs 201, 202, . . . , 20k' that is equal for all first switch means 3. Every first switch means 3 is fashioned such that every signal adjacent at one of its inputs 21 through 2k can be optionally switched to each of its outputs 201 through 20k'.

In a second stage, the switching network of FIG. 3 comprises a plurality k' of second switch means 4 for equal in number to the plurality k' of the outputs 201 through 20k' of the first switch means 3. Each of the second switch means 4 comprises a plurality L of inputs 31, 32, . . . 3L equal to the plurality L of first transmission media 1 and the same plurality L of outputs 301, 302, . . . , 30L. Every second switch means 4 is fashioned such that every signal adjacent at one of its inputs 31 through 3L can be optionally switched to each of its outputs 301 through 30L.

In the third stage, the switching network of FIG. 3 comprises a plurality L of third switch means 5 equal in number to the plurality L of second transmission media 2. Each of the third switch means 5 is allocated to exactly one second transmission medium 2. Every third switch means 5 comprises a plurality k' of inputs 51, 52 . . . 5k equal to the plurality k' of second switch means 4 and a plurality k of outputs 401, 402, . . . , 40k equal to the plurality k of channels of the allocated second transmission medium 2. Also, every third switch means 5 is fashioned such that every signal at one of its inputs 51 through 5k' can be optionally switched to each of its outputs.

The outputs 201 through 20k' of every first switch means 3 of the first stage are connected to all second switch means 4 of the second stage such that every output 201 through 20k' of this first switch means 3 is connected to a respective input 31, 32, or 3L of every switch means 4 and every input 31 through 3L of every second switch means 4 is connected to a respective output of each of the first switch means 3, for example as shown in FIG. 3.

The inputs 51 through 5L of every third switch means 5 are connected to all second switch means 4 such that every respective input 51, 52, . . . or 5k' of this third switch means 5 is connected to a respective output 301, 302, . . . or 30L of every second switch means 4 and every respective output 301, 302, . . . or 30L of the second switch means 4 is connected to a respective input 51, 52, . . . or 5k' of the third switch means 5, for example as shown in FIG. 3.

In a traditional switching network of this type according to FIG. 3, the first, second and third switch means 3, 4, 5 are each respectively composed of a cross bar matrix. In the switching network of the present invention according to FIG. 3, by contrast, every first, second and third switch means 3, 4, 5 is foraged of a shared-medium switch. The shared-medium switches of the first and second switch means 3, 4 operate according to the principle of distributing and selecting predetermined frequencies and the shared-medium switches of the third switch means 5 operate according to the principle of an addressing of predetermined frequencies.

FIG. 4 shows a preferred embodiment of a shared-medium switch operating according to the principle of distributing and selecting in a first switch means 3 that can be employed for every first switch means 3 of the switching network of FIG. 3.

In this shared-medium switch of FIG. 4, every input 21, 22, . . . or 2k of this first switch means 3 has a respective frequency from a plurality k of predetermined frequencies f1 through fk different from one another that is equal in number to the plurality k of channels permanently allocated to it on the basis of a distribution of these predetermined frequencies f1 through fk predetermined for this first switch means onto the inputs 21 through 2k of this first switch means 3. Every signal supplied on the common carrier frequency f0 to each of these inputs 21, 22, . . . or 2k can be transformed onto the frequency permanently allocated to this input 21, 22 . . . or 2k and can be distributed in terms of power onto the outputs 201 through 20k' of this first switch means 3.

At each of these outputs 201 through 20k' a signal from a power part allocated to this output on the basis of the power-associated distribution of the signals on a frequency freely selectable from the various, predetermined frequencies f1 through fk can be selected and this selected signal on this frequency can be transformed onto the common carrier frequency f0.

As depicted in FIG. 5 shared-medium switch of a second switch means 4 that can be employed for every second switch means 4 of the switching network of FIG. 3 is fashioned such that every input 31, 32, . . . or 3L of this second switch means 4 has respectively one frequency from a plurality L of different frequencies f, f2, . . . , fL selected from the predetermined frequency f1 through fk equal in number of the plurality L of inputs of this second switch means 4 permanently allocated to it on the basis of a distribution of the selected frequency f1 through fL onto the inputs 31 through 3L of this second switch means 4 predetermined for this second switch means 4. The shared-medium switch is also fashioned such that every signal supplied to this input 31, 32, . . . or 3L on the common carrier frequency f0 can be transformed onto the frequency permanently allocated to this input 31, 32, . . . or 3L and can be distributed in terms of power onto the outputs 301 through 30L of this second switch means 4. In this shared-medium switch of the second switch means 4, moreover, a signal on a frequency freely selectable from the various, selected frequencies f1 through fL can be selected at each of the outputs 301 through 30L from a power part allocated to this output by the power-associated distribution of the signals and this selected signal can be transformed onto the common carrier frequency f0.

A preferred embodiment of a shared-medium switch of a first switch means 3 is shown in FIG. 4 and a preferred embodiment of a shared-medium switch of a second switch means 4 is shown in FIG. 5.

According to FIG. 4, the shared-medium switch of the first switch means 3 comprises a respective frequency converter 61, 62, . . . or 6k of the input side per respective input 21, 22, . . . or 2k of this first switch means 3 for the reception of a signal supplied to this input on the common carrier frequency f0 and for converting this signal into a corresponding signal on the frequency permanently allocated to this input from the various, predetermined frequencies f1 through fk.

Over and above this, a means 20 is provided for the power-associated distribution of the signals transformed onto the various frequencies f1 through fk onto the outputs 201 through 20k' of this first switch means 3.

Further, a frequency converter 170 of the output side optionally tunable to each of the various, predetermined frequencies f1 through fk is provided per output 201, 202, ... or 20k' for the reception of the power part allocated to this respective output 201, 202, ... or 20k' on the basis of the power-associated distribution of the signals. This is for the selection of a signal from this power part on a frequency to which the frequency converter 170 of the output side is tuned at the moment, and for the conversion of this selected signal on this frequency into a corresponding signal on the carrier frequency f0.

The embodiment of the shared-medium switch of the second switch means 4 shown in FIG. 5 differs from the embodiment of FIG. 4 of the shared-medium switch of the first switch means 3 only in that a plurality L of frequency converters 61 through 6L of the input side are present instead of k frequency converters 61 through 6k of the input side and the identical plurality L of frequency converters 170 of the output side are provided instead of k' frequency converters of the output side. Also, the frequency converters 61 through 6L of the input side transform to the selected frequency f1 through fL instead of the predetermined frequency f1 through fk. Furthermore, the frequency converters 170 of the output side are supplied with the selected frequencies instead of being supplied with the predetermined frequencies.

Every frequency converter 61 through 6k or 61 through 6L at the input side of a shared-medium switch of FIG. 4 or FIG. 5 preferably comprises a signal receiver 110 tuned to the common carrier frequency f0 for detecting a signal on this carrier frequency f0 and a signal transmitter 221 through 22k or 221 through 2L. Dependent on the detected signal, a signal is output that is identical to this detected signal on the carrier frequency f0 on the frequency permanently allocated to the input 21 through 2k or 21 through 2L belonging to this frequency converter 61 through 6k or 61 through 6L.

Every frequency converter 170 of the output side in the shared-medium switch of FIG. 4 or 5 preferably comprises a signal receiver 330 optionally tunable to each of the various, predetermined frequencies f1 through fk for detecting a signal on the frequency to which the signal receiver 330 is tuned at the moment. Every frequency converter 170 also comprises a signal transmitter 440 that, dependent on the detected signal, generates a signal identical to this detected signal on this frequency on the common carrier frequency f0.

The shared-medium switch of every third switch means 5 is preferably fashioned such that the signal on the common carrier frequencies f0 supplied to the various inputs 41 through 4k' of this third switch means 5 can be transformed freely selectable onto each of the predetermined frequencies f1 through fk, such that every signal transformed onto one of these predetermined frequencies can be distributed in terms of power onto the outputs 401 through 40k of this third switch means 5, and such that (at each of these outputs 401 through 40k) a signal on a frequency from the various, predetermined frequencies f1 through fk permanently allocated to this output on the basis of a distribution of the predetermined frequencies f1 through fk predetermined for this third switch means can be selected from a power part allocated to this output by the power-associated distribution of the signals. This selected signal can be transformed onto the common carrier frequency f0.

A preferred embodiment of a shared-medium switch of a third switch means 5 is shown in FIG. 6.

Per input 41 through 4k' of this switch means 5, this embodiment, comprises a respective, adjustable frequency converter 180 of the input side for receiving a signal on the common carrier frequency f0 supplied to this input and for converting this signal onto a frequency freely selectable for this input from the various, predetermined frequencies f1 through fk.

Further, a means 20 is provided for the power-associated distribution of each of the signals transformed onto the various, predetermined frequencies onto the outputs 401 through 40k of this third switch means 5.

Per output 401 through 40k of this third switch means 5 a respective frequency converter 71, 72, ... or 7k of the output side is provided for the reception of the power part allocated to respective output 401, 402, ... or 40k on the basis of the power-associated distribution of the signals and for selecting a signal from this power part on a frequency permanently allocated to this output on the basis of the predetermined, fixed distribution of the various frequencies f1 through fk onto the outputs 401 through 40k of this third switch means 5. The frequency converter also converts this selected signal into an identical signal on the common carrier frequency f0.

Every frequency converter 180 of the input side in the shared-medium switch of FIG. 6 comprises a signal receiver 110 tuned to the common carrier frequency f0 for detecting a signal on this carrier frequency f0. Every frequency converter 180 also comprises a signal transmitter 550 that can be freely set to each of the various, predetermined frequencies f1 through fk. This signal transmitter 550, dependent on the detected signal, generates a signal corresponding to the detected signal on the carrier frequency f0 on the predetermined frequency to which this signal transmitter 550 is set at the moment.

Every frequency converter 71 through 7k of the output side in the shared-medium switch of FIG. 6 preferably comprises a signal receiver tuned to the frequency permanently allocated to the respective output 401, 402, ... or 40k belonging to this frequency converter 71, 72 ... 7k for detecting a signal on this fixed frequency. Every frequency converter also comprises a signal transmitter 660 that, dependent on the detected signal, generates a signal identical to the detected signal on the fixed frequency on the common carrier frequency f0.

The shared-medium switches of FIGS. 4 and 5 are shared-medium switches that operate according to the principle of distributing and selecting with signal receivers 170 tunable to the various selectable frequencies f1 through fk or f1 through fL.

The shared-medium switch of FIG. 6 is a shared-medium switch that operates according to the principle of frequency addressing having signal transmitters 550 that can be set or are tuneable to the various, predetermined frequencies f1 through fk.

All signal receivers, such as 110 and 701 through 70k, and all signal transmitters, such as 41 through 4L, 221 through 22k, 440 and 660, to which respectively one frequency is permanently assigned from the various frequencies f0, f1, f2, . . . fk can be receivers or transmitters permanently fixed at or set to the allocated frequency that are set to the permanently allocated frequency.

Each of the switching networks of the present invention can be employed for electrical and optical switching systems, whereby the singly or doubly settable input or output frequency converters, such as 21 through 2L, 31 through 3L, 170 and 180, can be set to the desired frequency by control logical on a case-by-case basis.

Every switching network of the present invention can be made considerably more compact and can be considerably simplified by the known orthogonal topology for the interconnection. Let this be set forth with reference to an example of the coupling arrangement of FIG. 1 shown in FIG. 7 designed for optical signal transmission that stands for all other switching networks of the present invention.

According to FIG. 7, the k' switch mechanisms 10 that can also be switch mechanisms 10a (only one first switch mechanism thereof being shown) are arranged side-by-side in k vertical levels such that the inputs 101 through 10L and outputs 111 through 11L of every switch mechanism 10 are arranged in a row below one another in a respective vertical line 120 in such a level.

The L devices 70 of the input side and the L devices 80 of the output side, by contrast, are arranged under one another in parallel, horizontal planes such that the k' outputs 121 through 12k' of every means 70 of the input side and the k' inputs 131 through 13k' of every means 80 of the output side are respectively horizontally arranged side-by-side in a horizontal line 130 in such a plane.

The outputs 121 through 12k' of every means 70 of the input side and the switch mechanisms 10 arranged horizontally side-by-side are thereby spatially distributed such that an output 121 through 12k' of this means 70 and an input 101 through 10L of a switch mechanism 10 that are allocated to one another on the basis of a connection rule prescribed for all of these inputs and outputs lie opposite one another, as shown by way of example in FIG. 7 for the output 121 and input 101 as well as for the output 12k' and input 10L.

The analogous case applies to the outputs 111 through 11L of the switch mechanisms 10 and the inputs 131 through 13k' of the means 80 of the output side. For example, the output 111 and the input 131 as well as the input 11L and the output 13k' lie opposite one another here.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A switch mechanism having a plurality of inputs and a plurality of outputs for switching signals supplied to the inputs onto the outputs, every signal supplied to an input being switchable to each output, comprising:

a plurality of different first frequencies equal in number to the plurality of inputs, the plurality of different first frequencies being a subset of a plurality of predetermined different second frequencies;

the first frequencies being respectively allocated to the inputs such that each input is allocated to a different first frequency;

a plurality of singly adjustable first frequency converters equal in number to the plurality of inputs, said first frequency converters respectively connected to said inputs such that each first frequency converter is connected to a different input;

a respective first frequency converter converting a first signal on one of the second frequencies, the first signal being received on the respective input of the respective first frequency converter, into a second signal on the respective first frequency that is allocated to the respective input of this first frequency converter;

the first frequency converters being adjustable such that each first frequency converter can be set to any one of the second frequencies;

a plurality of doubly adjustable second frequency converters equal in number to the plurality of outputs, said second frequency converters respectively connected to said outputs such that each second frequency converter is connected to a different output;

means for power-associated distribution of each of the second signals to the second frequency converters such that each second signal is allocated to each second frequency converter in the form of a power-associated portion of the respective second signal, the second signals thereby being superimposed on one another at each second frequency converter;

a respective doubly adjustable second frequency converter converting a second signal on one of the first frequencies into a third signal on one of the second frequencies, this third signal appearing on the output connected to this second frequency converter;

the second frequency converters being adjustable such that each second frequency converter can be set to receive a second signal on any one of the first frequencies and to supply a third signal on any one of the second frequencies.

2. The switch mechanism according to claim 1, wherein a respective first frequency converter of an input side of the switch mechanism has a signal receiver tunable to each of the predetermined second frequencies for detecting a respective first signal on the frequency to which the signal receiver is currently set, and a signal transmitter for detected a respective second signal, corresponding to the detected first signal on the first frequency that is permanently allocated to the input for this respective frequency converter of the input side.

3. The switch mechanism according to claim 1, wherein a respective second frequency converter of an output side of the switch mechanism has a signal receiver tunable to each of the first frequencies for detecting a respective second signal on the first frequency to which the signal receiver is currently tuned, and a signal transmitter settable to each of the predetermined second frequencies for generating a respective third signal, corresponding to the detected second signal, on the predetermined second frequency to which this signal transmitter is currently set.

4. A switch mechanism having a plurality of inputs and a plurality of outputs for switching signals supplied to the inputs onto the outputs every signal supplied to an input being switchable to each output, comprising:

a plurality of different first frequencies equal in number to the plurality of outputs, the plurality of different first frequencies being a subset of a plurality of predetermined different second frequencies;

the first frequencies being respectively allocated to the outputs such that each output is allocated to a different first frequency;

a plurality of doubly adjustable first frequency converters equal in number to the plurality of inputs, said first frequency converters respectively connected to said inputs such that each first frequency converter is connected to a different input;

a respective first frequency converter converting a first signal on one of the second frequencies, the first signal being received on the respective input of the respective first frequency converter, into a second signal on the respective first frequency that is allocated to the respective input of this first frequency converter;

the first frequency converters being adjustable such that each first frequency converter can be set to receive a first signal on any one of the second frequencies and to supply a second signal on any one of the first frequencies;

a plurality of singly adjustable second frequency converters equal in number to the plurality of outputs, said second frequency converters respectively connected to said outputs such that each second frequency converter is connected to a different output;

means for power-associated distribution of each of the second signals to the second frequency converters such that each second signal is allocated to each second frequency converter in the form of a power-associated portion of the respective second signal, the second signals thereby being superimposed on one another at each second frequency converter;

a respective singly adjustable second frequency converter converting a second signal on one of the first frequencies into a third signal on one of the second frequencies, this third signal appearing on the output connected to this second frequency converter;

the second frequency converters being adjustable such that each second frequency converter can be set to supply a third signal on any one of the second frequencies.

5. The switch mechanism according to claim 4, wherein a respective first frequency converter of an input side of the switch mechanism has a signal receiver tunable to each of the predetermined second frequencies for detecting a respective first signal on the frequency to which the signal receiver is currently tuned, and a signal transmitter settable to each of the second frequencies for generating a respective second signal corresponding to the detected first signal on the first frequency to which this signal transmitter is currently set.

6. The switch mechanism according to claim 4, wherein a respective second frequency converter of an output side of the switch mechanism has a signal receiver tuned to the second frequency permanently allocated to the respective output for this frequency converter for detecting a second signal on the first frequency, and has a signal transmitter settable to each of the predetermined second frequencies for generating a third signal, corresponding to the detected second signal, on the predetermined second frequency to which this signal transmitter is currently set.

7. A switching network for interlinking a plurality of first transmission media to an identical plurality of second transmission media, every first transmission medium and every second transmission medium being provided for transmitting signals on a plurality of predetermined, different second frequencies, comprising:

a plurality of switch mechanism connected between said plurality of first transmission media and said plurality of second transmission media;

a plurality of input means equal in number to the plurality of first transmission media, each input means having an input connected to one of said first transmission media and having a plurality of outputs that are equal in number to the plurality of switch mechanisms, said plurality of outputs connected respectively to said plurality of switch mechanisms, each of said input means providing power-associated distribution of a signal on its input to each of its outputs;

each of the switch mechanisms having a plurality of inputs equal to the plurality of transmission media and having the same plurality of outputs, first frequencies being a subset of said second frequencies and being distributed onto the inputs of the switch mechanism in a same, predetermined distribution in all switch mechanisms;

a plurality of output means equal in number to the plurality of second transmission media, each output means having an output connected to one of said second transmission media and having a plurality of inputs that are equal in number to the plurality of switch mechanisms, said plurality of inputs connected respectively to said plurality of switch mechanisms;

the outputs of every input means connected to all switch mechanisms such that every output of a respective input means of the input side is connected to an input of a switch mechanism and every input of every switch mechanism is connected to an output of a respective input means of the input side; and the inputs of every output means connected to all switch mechanisms such that every input of a respective output means of the output side is connected to an output of a switch mechanism and every output of every switch mechanism is connected to an input of a respective output means to the output side.

8. The switching network according to claim 7, wherein each switch mechanism of the plurality of switch mechanisms has a plurality of outputs for switching signals supplied to the input onto the outputs, every signal supplied to an input being switchable to each output, and comprises:

a plurality of different first frequencies equal in number to the plurality of inputs, the plurality of different first frequencies being a subset of a plurality of predetermined different second frequencies;

the first frequencies being respectively allocated to the inputs such that each input is allocated to a different first frequency;

a plurality of singly adjustable first frequency converters equal in number to the plurality of inputs, said first frequency converters respectively connected to said inputs such that each first frequency converter is connected to a different input;

a respective first frequency converter converting a first signal on one of the second frequencies, the first signal being received on the respective input of the respective first frequency converter, into a second signal on the respective first frequency that is allocated to the respective input of the first frequency converter;

the first frequency converters being adjustable such that each first frequency converter can be set to any one of the second frequencies;

a plurality of doubly adjustable second frequency converters equal in number to the plurality of outputs, said second frequency converters respectively connected to said outputs such that each second frequency converter is connected to a different output;

means for power-associated distribution of each of the second signals to the second frequency converters such that each second signal is allocated to each second frequency converter in the form of a power-associated portion of the respective second signal, the second signals thereby being superimposed on one another at each second frequency converter;

a respective doubly adjustable second frequency converter converting a second signal on one of the first frequencies into a third signal on one of the second frequencies, this third signal appearing on the output connected to this second frequency converter;

the second frequency converters being adjustable such that each second frequency converter can be set to receive a second signal on any one of the first frequencies and to supply a third signal on any one of the second frequencies.

9. The switching network according to claim 7, wherein each switch mechanism of the plurality of switch mechanisms has, a plurality of inputs and a plurality of outputs for switching signals supplied to the inputs onto the outputs every signal supplied to an input being switchable to each output, and comprises:

a plurality of different first frequencies equal in number to the plurality of outputs, the plurality of different first frequencies being a subset of a plurality of predetermined different second frequencies;

the first frequencies being respectively allocated to the outputs such that each output is allocated to a different first frequency;

a plurality of doubly adjustable first frequency converters equal in number to the plurality of inputs, said first frequency converters respectively connected to said inputs such that each first frequency converter is connected to a different input; p1 a respective first frequency converter converting a first signal on one of the second frequencies, the first signal being received on the respective input of the respective first frequency converter, into a second signal on the respective first frequency that is allocated to the respective input of this first frequency converter;

the first frequency converters being adjustable such that each first frequency converter can be set to receive a first signal on any one of the second frequencies and to supply a second signal on any one of the first frequencies;

a plurality of singly adjustable second frequency converters equal in number to the plurality of outputs, said second frequency converters respectively connected to said outputs such that each second frequency converter is connected to a different output;

means for power-associated distribution of each of the second signals to the second frequency converters such that each second signal is allocated to each second frequency converter in the form of a power-associated portion of the respective second signal, the second signals thereby being superimposed on one another at each second frequency converter;

a respective singly adjustable second frequency converter converting a second signal on one of the first frequencies into a third signal on one of the second frequencies, this third signal appearing on the output connected to this second frequency converter;

the second frequency converters being adjustable such that each second frequency converter can be set to supply a third signal on any one of the second frequencies.

10. A switching network for interlinking a plurality of first transmission media to an identical plurality of second transmission media, every first transmission medium and every second transmission medium having a plurality of channels equal to a plurality of predetermined second frequencies for transmission of spatially separated signals on a common carrier frequency, comprising:

a plurality of switch mechanisms connected between said plurality of first transmission media and said plurality of second transmission media;

a respective input switch means of a plurality of input switch means of an input side provided per first transmission medium, said respective input switch means having a plurality of inputs equal to the plurality of channels and having a plurality of outputs equal to the plurality of switch mechanisms, each of the input switch means of the input side being fashioned such that each of the inputs of every input switch means of the input side has a respective, predetermined frequency permanently allocated to it on the basis of a distribution of predetermined second frequencies predetermined for this switch means of the input side and every signal on the common carrier frequency supplied to an input of every input switch means of the input side being transformed into a further signal corresponding to the supplied signal on the predetermined frequency permanently allocated to this input and being distributed in terms of power onto the outputs of this input switch means of the input side;

a respective output switch means of a plurality of output switch means of an output side provided per second transmission medium, said respective output switch means having a plurality of inputs equal to the plurality of switch mechanisms and having a plurality of outputs equal to the plurality of channels, each of the output switch means of the output side being fashioned such that every signal on one of the predetermined frequencies second supplied to an input of the respective output switch means of the output side is distributed in terms of power onto the outputs of the respective output switch means, such that every output of the respective output switch means of the output side has one of the predetermined frequencies permanently allocated to it on the basis of a distribution of the predetermined frequencies predetermined for the respective output switch means of the output side, and such that a signal on the predetermined frequency permanently allocated to the output is selected from a power portion of this signal allocated to each output of every output switch means of the output side on the basis of a power-associated distribution of signals and is transformed into a signal on the common carrier frequency corresponding to this signal;

the outputs of every input switch means of the input side connected to all switch mechanisms such that every output of a respective input switch means of the input side is connected to an input of a switch mechanism and every input of every switch mechanism is connected to an output of an input switch means of the input side; and the inputs of every output switch means of the output side connected to all switch mechanisms such that every input of every output switch means of the output side are connected to all switch mechanisms such that every input of a respective output switch means of the output side is connected to an output of a switch mechanism and every output of every switch mechanism is connected to an input of a respective output switch means of the output side.

11. The switching network according to claim 10, wherein each switch mechanism of the plurality of switch mechanisms has a plurality of outputs for switching signals supplied to the inputs onto the outputs, every signal supplied to an input being switchable to each output, and comprises:

a plurality of different first frequencies equal in number to the plurality of inputs, the plurality of different first frequencies being a subset of a plurality of predetermined different second frequencies;

the first frequencies being respectively allocated to the inputs such that each input is allocated to a different first frequency;

a plurality of singly adjustable first frequency converters equal in number to the plurality of inputs, said first frequency converters respectively connected to said inputs such that each first frequency converter is connected to a different input;

a respective first frequency converter converting a first signal on one of the second frequencies, the first signal being received on the respective input of the respective first frequency converter, into a second signal on the respective first frequency that is allocated to the respective input of this first frequency converter;

the first frequency converters being adjustable such that each first frequency converter can be set to any one of the second frequencies;

a plurality of doubly adjustable second frequency converters equal in number to the plurality of outputs, said second frequency converters respectively connected to said outputs such that each second frequency converter is connected to a different output;

means for power-associated distribution of each of the second signals to the second frequency converters such that each second signal is allocated to each second frequency converter in the form of a power-associated portion of the respective second signal, the second signals thereby being superimposed on one another at each second frequency converter;

a respective doubly adjustable second frequency converter converting a second signal on one of the first frequencies into a third signal on one of the second frequencies, this third signal appearing on the output connected to this second frequency converter;

the second frequency converters being adjustable such that each second frequency converter can be set to receive a second signal on any one of the first frequencies and to supply a third signal on any one of the second frequencies.

12. The switching network according to claim 10, wherein each switch mechanism of the plurality of switch mechanisms has, a plurality of inputs and a plurality of outputs for switching signals supplied to the inputs onto the outputs every signal supplied to an input being switchable to each output, and comprises:

a plurality of different first frequencies equal in number to the plurality of outputs, the plurality of different first frequencies being a subset of a plurality of predetermined different second frequencies;

the first frequencies being respectively allocated to the outputs such that each output is allocated to a different first frequency;

a plurality of doubly adjustable first frequency converters equal in number to the plurality of inputs, said first frequency converters respectively connected to said inputs such that each first frequency converter is connected to a different input;

a respective first frequency converter converting a first signal on one of the second frequencies, the first signal being received on the respective input of the respective first frequency converter, into a second signal on the respective first frequency that is allocated to the respective input of this first frequency converter;

the first frequency converters being adjustable such that each first frequency converter can be set to receive a first signal on any one of the second frequencies and to supply a second signal on any one of the first frequencies;

a plurality of singly adjustable second frequency converters equal in number to the plurality of outputs, said second frequency converters respectively connected to said outputs such that each second frequency converter is connected to a different output;

means for power-associated distribution of each of the second signals to the second frequency converters such that each second signal is allocated to each second frequency converter in the form of a power-associated portion of the respective second signal, the second signals thereby being superimposed on one another at each second frequency converter;

a respective singly adjustable second frequency converter converting a second signal on one of the first frequencies into a third signal on one of the second frequencies, this third signal appearing on the output connected to this second frequency converter;

the second frequency converters being adjustable such that each second frequency converter can be set to supply a third signal on any one of the second frequencies.

13. The switching network according to claim 10, wherein each switch means of the input side has a plurality of frequency converters, each frequency converter of the input side per input of the input switch means of the input side converting a signal on the common carrier frequency supplied to this input into a further signal corresponding to this signal on the predetermined second frequency permanently allocated to this input and has a means for the power-associated distribution of every signal brought onto a predetermined second frequency by a respective frequency converter of the input side onto the outputs of the respective input switch means of the input side.

14. The switching network according to claim 13, wherein each of said frequency converters of a respective switch means of the input side has a signal receiver tuned to the common carrier frequency for detecting a supplied signal on the carrier frequency and has a signal transmitter for generating a further signal corresponding to this detected signal on the predetermined second frequency permanently allocated to the input of the input switch means of the input side for this frequency converter of the input side.

15. The switching network according to claim 10, wherein each output switch means of the output side has a means for the power-associated distribution of every signal on each of the predetermined second frequencies supplied to an input of the output switch means of the output side onto the outputs of the output switch means of the output side and has a respective frequency converter of a plurality of frequency converters per output of the output switch means of the output side for reception of a power portion of this signal allocated to this output by the power-associated distribution of the signals, for selecting a signal on the predetermined second frequency permanently allocated to this output from the allocated power part and for transforming this selected signal on this second frequency into a signal corresponding to this signal on the common carrier frequency.

16. The switching network according to claim 15, wherein each of said frequency converters of a respective switch means of the output side has a signal receiver tuned to the predetermined second frequency permanently allocated to the output of the respective output switch means of the output side for this frequency converter of the output side for detecting a supplied signal on the predetermined second frequency and has a signal transmitter for generating a signal corresponding to this detected signal on the common carrier frequency.

17. A switching network for interlinking a plurality of first transmission media with an identical plurality of second transmission media, whereby every first transmission medium and every second transmission medium respectively has the same number of spatially separated channels for spatially separate transmission of signals on a common carrier frequency, comprising:

a plurality of first switch means equal to the plurality of the first transmission media, each of said first switch means being allocated to exactly one transmission medium, each first switch means having a plurality of inputs equal to the plurality of the channels of the allocated, first transmission medium for respectively one of said channels and having an equal plurality of outputs for all first switch means, and every first switch means being fashioned such that every signal adjacent at one of the inputs thereof is switchable onto each of the outputs thereof;

a plurality of second switch means equal to the plurality of outputs of a first switch means, each of said second switch means having a plurality of inputs equal to the plurality of first transmission media and having the same plurality of outputs, every second switch means being fashioned such that every signal adjacent at one of the inputs thereof is switchable onto each of the outputs thereof;

a plurality of third switch means equal to the plurality of second transmission media, each of said third switch means being allocated to exactly one second transmission medium, every third switch means having a plurality of inputs equal to the plurality of second switch means and having a plurality of outputs equal to the plurality of channels of the allocated, second transmission medium, and every third switch means being fashioned such that every signal adjacent at one of the inputs thereof is switchable onto each of the outputs thereof;

the outputs of every first switch means connected to all second switch means such that every output of a respective first switch means is connected to an input of every second switch means and every input of every second switch means is connected to an input of a first switch means;

the inputs of every third switch means connected to all second switch means such that every input of a respective third switch means is connected to an output of every second switch means, and every output of every second switch means is connected to an input of a third switch means;

first, second and third switch means each being formed by a respective shared-medium switch, the shared-medium switch of the first and second switch means operating according to the principle of a distribution and selection of pre-determined frequencies and the shared-medium switch of the third switch means operating according to the principle of an addressing of predetermined frequencies.

18. The switching network according to claim 17, wherein each first switch means is formed of a shared-medium switch, whereby every input of this first switch means has a respective frequency from a plurality of predetermined frequencies differing from one another and equal in plurality to the plurality of channels allocated thereto on the basis of a distribution of the predetermined first frequencies onto the inputs of this first switch means predetermined for this first switch means, and every signal on the common carrier frequency supplied to this input thereof being transformed onto the frequency permanently allocated to this input and being distributed onto the outputs of this first switch means in terms of power, and wherein a signal on a frequency selectable from the predetermined frequencies is selected at each of the outputs from a power portion of this signal allocated to this output by the power-associated distribution of the signals and this selected signal on this frequency transformed onto the common carrier frequency.

19. The switching network according to claim 17, wherein each second switch means is formed of a shared-medium switch, wherein every input of this second switch means has a respective frequency from a plurality of first frequencies selected from a plurality of predetermined second frequencies, said plurality of first frequencies being equal to the plurality of inputs of this second switch means of different, said predetermined second frequencies being different from one another and equal in plurality to the plurality of channels permanently allocated thereto on the basis of a distribution of the selected first frequencies onto the inputs predetermined for this second switch means, and every signal on the common carrier frequency supplied to this input being transformed onto the first frequency permanently allocated to this input and being distributed in terms of power onto the outputs of this second switch means, and wherein a signal on a frequency being selected at each of these outputs from a power portion of this signal allocated to this output by the power-associated distribution of the signals and this selected signal being transformed onto the common carrier frequency.

20. The switching network according to claim 17, wherein each third switch means is formed of a shared-medium switch, wherein the signals on the common carrier frequency supplied to inputs of this third switch means is transformed in freely selectable fashion onto every frequency from a plurality of different, predetermined frequencies equal in number to the plurality of channels, each signal transformed onto one of these predetermined frequencies being distributed in terms of power onto the outputs of this third switch means, and wherein a signal on a frequency of predetermined frequencies permanently allocated to this output on the basis of a distribution of the predetermined frequencies onto the outputs of this third switch means, which is predetermined for this third switch means, being selected at each of these outputs from a power portion of this signal allocated to this output by the power-associated distribution of the signals and this selected signal being transformed onto the common carrier frequency.

21. The switching network according to claim 18, wherein the shared-medium switch of a first switch means has a respective frequency converter of the input side per input of this first switch means for the reception of a signal on the common carrier frequency supplied to this input and for converting this supplied signal into a corresponding signal on the frequency permanently allocated to this input from the predetermined frequencies;

means for power-associated distribution of each of signals transformed onto the predetermined frequencies onto the outputs of this first switch means; and a frequency converter of the output side selectively tunable to each of the predetermined frequencies; per output of this first switch means for reception of the power portion of a signal allocated to this output on the basis of the power-associated distribution of the signals, for selecting a signal from this power portion of this signal on a frequency to which the frequency converter of the output side is tuned at the moment, and for converting this selected signal on this frequency into a corresponding signal on the carrier frequency.

22. The switching network according to claim 18, wherein each frequency converter at the input side of the shared-medium switch of a respective first switch means has a signal receiver tuned to the common carrier frequency for detecting a signal on this carrier frequency and has a signal transmitter for generating a signal corresponding to the detected signal on the carrier frequency on the frequency permanently allocated to the input for this frequency converter.

23. The switching network according to claim 18, wherein each frequency converter at the output side of the shared-medium switch of a respective first switch means has a signal receiver selectively tunable to each of the predetermined frequencies for detecting a signal on the frequency to which the signal receiver is tuned at the moment, and has a signal transmitter for generating a signal on the common carrier frequency which corresponds to this detected signal on this frequency.

24. The switching network according to claim 20, wherein the shared-medium switch of a third switch means has a respective, adjustable frequency converter of the input side per input for the reception of a signal on the common carrier frequency supplied to this input and for converting this signal onto a frequency freely selectable from the predetermined frequencies for this input;

means for power-associated distribution of each of said signals transformed onto the predetermined frequencies onto the outputs of this third switch means; and a respective frequency converter of the output side per output of this third switch means for the reception of a power portion of a signal allocated to this output on the basis of the power-associated distribution of the signals and for selecting a signal from this power portion of this signal on a frequency permanently allocated to this output on the basis of the predetermined, fixed distribution of the frequencies onto the outputs of this third switch means and for converting this selected signal into a corresponding signal on the common carrier frequency.

25. The switching network according to claim 20, wherein each frequency converter at the input side of the shared-medium switch of a respective third switch means has a signal receiver tuned to the common carrier frequency for detecting a signal on this carrier frequency and has a signal transmitter freely settable to each of the predetermined frequencies for generating a signal corresponding to the detected signal on the carrier frequency on the predetermined frequency to which this signal transmitter is set at the moment.

26. The switching network according to claim 20, wherein each frequency converter at the output side of the shared-medium switch of a respective third switch means has a signal receiver tuned to the frequency permanently allocated to the output belonging to this frequency converter for detecting a signal on this fixed frequency and has a signal transmitter for generating a signal on the common carrier frequency that corresponds to the detected signal on the fixed frequency.

27. The switching network according to claim 19, wherein the shared-medium switch of a second switch means has a respective frequency converter of the input side per input of this second switch means for the reception of a signal on the common carrier frequency supplied to this input and for converting this supplied signal into a corresponding signal on the frequency permanently allocated to this input from the predetermined frequencies;

means for power-associated distribution of each of signals transformed onto the predetermined frequencies onto the outputs of this second switch means; and a frequency converter of the output side selectively tunable to each of the predetermined frequencies; per output of this second switch means for reception of the power portion of a signal allocated to this output on the basis of the power-associated distribution of the signals, for selecting a signal from this power portion of this signal on a frequency to which the frequency converter of the output side is tuned at the moment, and for converting this selected signal on this frequency into a corresponding signal on the carrier frequency.

28. The switching network according to claim 19, wherein each frequency converter at the input side of the shared-medium switch of a respective second switch means has a signal receiver tuned to the common carrier frequency for detecting a signal on this carrier frequency and has a signal transmitter for generating a signal corresponding to the detected signal on the carrier frequency on the frequency permanently allocated to the input for this frequency converter.

29. The switching network according to claim 19, wherein a frequency converter at the output side of the shared-medium switch of a respective second switch means has a signal receiver selectively tunable to each of the predetermined frequencies for detecting a signal on the frequency to which the signal receiver is tuned at the moment, and has a signal transmitter for generating a signal on the common carrier frequency which corresponds to this detected signal on this frequency.

* * * * *